United States Patent
Sato et al.

(10) Patent No.: US 6,462,836 B1
(45) Date of Patent: Oct. 8, 2002

(54) DOUBLE-TONE PRINTER AND METHOD OF MAKING DENSITY CORRECTION CURVE FOR DOUBLE-TONE PRINTING

(75) Inventors: Hisako Sato; Koichi Hashimoto, both of Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/260,537

(22) Filed: Mar. 2, 1999

(30) Foreign Application Priority Data

Mar. 4, 1998 (JP) .......................................... 10-052068
Dec. 18, 1998 (JP) .......................................... 10-360740

(51) Int. Cl.$^7$ .............................................. G06K 15/00
(52) U.S. Cl. ........................ 358/3.01; 358/1.9; 358/1.4
(58) Field of Search ........................ 358/1.9, 1.4, 455, 358/458, 3.01, 3.02; 382/169; 347/188; 101/114–115, 119

(56) References Cited

U.S. PATENT DOCUMENTS

| | | | |
|---|---|---|---|
| 4,977,605 A | | 12/1990 | Fardeau et al. ................ 382/51 |
| 5,276,459 A | * | 1/1994 | Danzuka et al. ........... 346/33 A |
| 5,345,315 A | | 9/1994 | Shalit .......................... 358/406 |
| 5,574,544 A | | 11/1996 | Yoshino et al. ................ 399/60 |
| 5,696,889 A | | 12/1997 | Morikawa .................... 358/1.9 |
| 6,178,008 B1 | * | 1/2001 | Bockman et al. ............. 358/1.1 |

FOREIGN PATENT DOCUMENTS

| | | |
|---|---|---|
| EP | 0 477 730 | 4/1992 |
| JP | 7-132671 | 5/1995 |
| JP | 08-289148 | 11/1996 |
| WO | WO 01/48100 A1 * | 7/2001 |

OTHER PUBLICATIONS

European Search Report 3 pages, May 17, 2001.

* cited by examiner

*Primary Examiner*—Thomas D. Lee
*Assistant Examiner*—Stephen Brinich
(74) *Attorney, Agent, or Firm*—Nixon Peabody LLP; Donald R. Studebaker

(57) ABSTRACT

A double-tone printer includes an image scanner which inputs an image signal representing an original. The image signal is converted into a density signal according to a density correction curve for a light color and a stencil master making signal for the light color is made by binary-coding the density signal. Further the image signal is converted into a density signal according to a density correction curve for a dark color and a stencil master making signal for the dark color is made by binary-coding the density signal components. Images of the respective stencil masters made on the basis of the stencil master making signals for the light color and the dark color are printed on a printing paper in light color ink and dark color ink so that the printed images in the respective color inks overlap each other. The density correction curve for the light color gives a print density which increases with increase in the value of the image signal in a first range where the value of the image signal is lower than a threshold value and is a fixed maximum print density in a second range where the value of the image signal is not lower than the threshold value, and the density correction curve for the dark color gives a print density which is a fixed minimum print density in the first range and increases with increase in the value of the image signal in the second range.

6 Claims, 9 Drawing Sheets

DOUBLE-TONE PRINTER AND METHOD OF MAKING DENSITY CORRECTION CURVE FOR DOUBLE-TONE PRINTING

BACKGROUND OF THE INVENTION

1. Field of the Invention

This invention relates to a double-tone printer in which an image is printed in light color ink and dark color ink which are overlapped with each other, and more particularly to a double-tone printer such as a digital stencil printer for professional use which prints a high quality black-and-white image and a method of making a density correction curve for use in a density correction processing of a digital image with double-tone printing.

2. Description of the Related Art

For example, a digital stencil printer has been widely used because of its high printing speed and low cost. In the digital stencil printer, a stencil master is made by bringing a thermal head, provided with an array of heater elements which are selectively heated according to an image to be printed, into contact with a heat-sensitive master material so that the parts of the heat-sensitive master material brought into contact with the heated heater elements are perforated and become ink-permeable and form picture elements.

In the digital stencil printer, gradation is controlled by controlling the density of the dots (picture elements). Accordingly, in a low density region, grain coarseness appears in the image due to a low dot density. Further since it is hard to uniform the size and shape of the dots, rough impression appears in a low density region and an intermediate density region.

As a method of printing a high quality black-and-white image, there has been a method known as double-tone printing. In the double-tone printing, two kinds of stencil masters are made on the basis of an original and printing is effected by use of the stencil masters with light color ink and dark color ink which are similar in hue. The light color ink is generally gray ink and the dark color ink is generally black ink. In this system, to faithfully reproduce the gradation of the original is important, and gradation of an intermediate density region to a high density region which has been hard to reproduce in conventional black-and-white printing can be expressed and depth of an image can be obtained. (See, for instance, "All of Scanner": Nihon Gijutsu Insatu Kyoukai, from P78 on.) It is expected that when the technique of double-tone printing is applied to the digital stencil printing, appearance of grain coarseness in a low density region and appearance of rough impression in an intermediate density region can be suppressed.

As methods of making two kinds of stencil masters in the double-tone printing, there have been known those in which a plate making camera or a scanner is used and the two kinds of stencil masters are made by use of different tone curves.

However, since the two different tone curves are empirically set by a printer operator, the steps of making stencil masters and trial printing must be repeated until a desired density of the image is obtained.

To the contrast, there are methods in which the density obtained when the light color ink image and the dark color ink image are overlapped is theoretically obtained without actually effecting printing. For example, there has been known a method in which Neugebauer equation (Neugebauer, H. E.: Z. wiss. Phot., 34(4)(1937), p.73), an equation obtained by combining the proportions of areas of the respective color inks with mean additive blending, is used and the print density for given proportions of areas of the respective color inks is obtained.

However, in this method, there are enormous number of combinations of proportions of the color ink areas for a given print density. Accordingly, it is impossible to determine the tone curves for the respective inks on the basis of a target print density by use of Neugebauer equation. That is, there are many solutions for the equation unless one of the tone curves is determined.

Accordingly, conventionally, the proportion of the area of gray ink ag and the proportion of the area of black ink ak are related to each other to satisfy the following formula (1)

$$ag = K \cdot ak \qquad (1)$$

wherein K represents a value depending on a target reflectance, so that only one solution is obtained.

When the technique of the known double-tone printing is applied to the digital stencil printing as it is, the advantages of the stencil printing that the printing speed is high and printing cost is low are sacrificed due to the fact that the steps of making stencil masters and trial printing must be repeated though the quality of the printed matter is improved.

When the aforesaid formula (1) is used, the problem of the printing time and the printing cost is overcome to some extent. However this approach is disadvantageous in that since both the light color ink (gray ink) and the dark color ink (black ink) must be constantly used according to the formula (1), black ink must be included in a predetermined proportion of area even in a low density region and accordingly the picture element density is still low in such a low density region, whereby grain coarseness cannot be sufficiently removed.

SUMMARY OF THE INVENTION

In view of the foregoing observations and description, the primary object of the present invention is to provide a double-tone printer in which a print density suitable for suppressing appearance of grain coarseness in a low density region and appearance of rough impression in an intermediate density region can be quickly determined without repetition of trial printings and a high quality printing can be easily effected.

Another object of the present invention is to provide a method of making density correction curves for double-tone printing rationally in a routinized manner.

In accordance with a first aspect of the present invention, there is provided a double-tone printer comprising, as shown in FIG. 1, an image input means which inputs an image signal made up of a series of image signal components each representing a picture element on an original, a stencil master making signal producing means which converts the image signal into a density signal made up of a series of density signal components each representing a print density of a picture element according to a density correction curve for a light color and makes a stencil master making signal for the light color by binary-coding the density signal components and which converts the image signal into a density signal made up of a series of density signal components each representing a print density of a picture element according to a density correction curve for a dark color and makes a stencil master making signal for the dark color by binary-coding the density signal components, a stencil master making means which makes a light color stencil master and a dark color stencil master respectively on the basis of the stencil master making signal for the light color and the stencil master making signal for the dark color, and a printing means which prints the images of the respective stencil masters on a printing paper in light color ink and dark color ink so that the printed images in the respective color inks overlap each other, wherein the improvement comprises that the density correction curve for the light color gives a print density which increases with increase in the value of the image signal component in a lower range where the values of the image signal components are lower than a threshold value and is fixed at a maximum value in a higher range where the values of the image signal components are not lower than the threshold value, and the density correction curve for the dark color gives a print density which is fixed at a minimum value in the lower range and increases with increase in the value of the image signal component in the higher range.

In the printer with this arrangement, out of the image obtained from the stencil master making signal for the light color, the region which can be expressed by the light color ink is printed solely in the light color ink and the region which cannot be expressed solely by the light color ink is printed in both the light color ink and the dark color ink.

Further when the density correction curve for the light color and that for the dark color are made on the basis of a test chart printed by use of said stencil master making means and said printing means, higher quality printing can be realized according to change in the printing condition and the like.

Though the density correction curves may be calculated by a personal computer and the like and the result of the calculation may be input into the printer, it is preferred that the printer be provided therein with function of making the density correction curves.

In accordance with a second aspect of the present invention, there is provided a method of making the density correction curves for the light color and the dark color which are used in a double-tone printer, the method comprising the steps of obtaining a gray scale image signal which represents a gray scale having a plurality of regions which are different from each other in density and is made up of a series of image signal components, obtaining a solid image signal which represents a solid image made up of picture elements which are the same in density and is made up of a series of image signal components which are the same in value, printing an image of a gray scale in light color ink on a first printing paper according to the gray scale image signal, an image of a gray scale in dark color ink on a second printing paper according to the gray scale image signal, and solid images on a third printing paper in the light color ink and the dark color ink according to the solid image signal so that the images printed in the light color ink and the dark color ink overlap each other, measuring the reflectances of the images on the first to third printing papers, thereby obtaining a light color ink reflectance curve which represents the relation between the reflectance of each regions of the image of the gray scale printed on the first printing paper in the light color ink and the value of the image signal components corresponding to the region, a dark color ink reflectance curve which represents the relation between the reflectance of each regions of the image of the gray scale printed on the second printing paper in the dark color ink and the value of the image signal components corresponding to the region, and the reflectance given by the overlapping solid prints in the light color ink and the dark color ink, obtaining a target print reflectance curve, which represents a desired relation between the values of the image signal components and the reflectance of a printed image obtained by the double-tone printing on the basis of said reflectance curves and the reflectance, obtaining a density correction curve for the light color, which, in order to express only in the light color ink a range of reflectance which can be expressed only in the light color ink, gives a print density which increases with increase in the value of the image signal component in a lower range where the values of the image signal components are lower than a threshold value and is fixed at a maximum value in a higher range where the values of the image signal components are not lower than the threshold value, on the basis of the target print reflectance curve and the light color ink reflectance curve, calculating the proportion of the area of the dark color ink and the reflectance of the dark color ink corresponding to the proportion of the area of the dark color ink on the basis of the density correction curve for the light color and the target print reflectance curve, and obtaining a density correction curve for the dark color, which, in order to express in both the light color ink and the dark color ink a range of reflectance which cannot be expressed only in the light color ink, gives a print density which is fixed at a minimum value in the lower range and increases with increase in the value of the image signal component in the higher range on the basis of the calculated reflectance of the dark color ink and the dark color ink reflectance curve.

For example, the image signal may be a digital image signal obtained by digitizing an analog image signal read out from an original such as a photography or a document by an image scanner, or a digital image signal representing an image made as a graphic data by a personal computer or the like.

The reflectance of the image may be measured by use of a calorimeter or by use of an image scanner for reading out the image on the original as a substitute for the calorimeter.

Calculation of the proportion of the area of the dark color ink and the reflectance of the dark color ink corresponding to the proportion of the area of the dark color ink can be effected by use of equations such as Neugebauer equation which have been known in the field of double-tone printing.

In accordance with a third aspect of the present invention, there is provided a double-tone printer having therein a system for making the density correction curves for the light color and the dark color according to the method of the second aspect. That is, the double-tone printer in accordance with the third aspect of the present invention comprises an image input means which inputs a digital image signal made up of a series of image signal components each representing a picture element on an original, a tone curve storage means which stores a tone curve representing the relation between the value of each image signal component of the digital image signal and the print density to be used in double-tone printing, a density correction means which corrects the densities of the picture elements represented by the image signal components of the digital image signal according to a predetermined density correction curve, and a stencil master making/printing means which binary-codes the densities of the picture elements represented by the corrected image signal, makes a stencil master on the basis of the binary-coded image signal and makes a print by use of the stencil master, wherein the improvement comprises a gray scale printing means which prints an image of a gray scale in light color ink on a first printing paper according to a gray scale image signal which represents a gray scale having a plurality of regions which are different from each other in density and is made up of a series of image signal components, and prints an image of a gray scale in dark color ink on a second printing paper according to the gray scale image signal, a solid image printing means which prints solid images on a third printing paper in the light color ink and the dark color ink according to a solid image signal which represents a solid image made up of picture elements which are the same in density and is made up of a series of image signal components which are the same in value so that the images printed in the light color ink and the dark color ink overlap each other, a colorimetry means which measures the reflectances of the images on the first to third printing papers, a light color ink reflectance curve making means which makes a light color ink reflectance curve, which represents the relation between the reflectance of each regions of the image of the gray scale printed on the first printing paper in the light color ink and the value of the image signal components corresponding to the region, on the basis of the measured reflectance of the image on the first printing paper, a dark color ink reflectance curve making means which makes a dark color ink reflectance curve, which represents the relation between the reflectance of each regions of the image of the gray scale printed on the second printing paper in the dark color ink and the value of the image signal components corresponding to the region, on the basis of the measured reflectance of the image on the second printing paper, a target print reflectance curve making means which makes a target print reflectance curve, which represents a desired relation between the values of the image signal components and the reflectance of a printed image obtained by the double-tone printing, on the basis of said reflectance curves and the reflectance, a light color density correction curve making means which makes a density correction curve for the light color, for expressing only in the light color ink a range of reflectance which can be expressed only in the light color ink, on the basis of the target print reflectance curve and the light color ink reflectance curve, a calculating means which calculates the proportion of the area of the dark color ink and the reflectance of the dark color ink corresponding to the proportion of the area of the dark color ink on the basis of the density curve for the light color and the target print reflectance curve, and a dark color density correction curve making means which makes a density correction curve for the dark color, for expressing in both the light color ink and the dark color ink a range of reflectance which cannot be expressed only in the light color ink, on the basis of the calculated reflectance of the dark color ink and the dark color ink reflectance curve, wherein the density correction means corrects the densities of the picture elements represented by the image signal components of the digital image signal according to one of the density correction curves for the light color and the dark color so that the range of density which can be expressed only in the light color ink is expressed only in the light color ink and the range of density which cannot be expressed only in the light color ink is expressed in both the light color ink and the dark color ink.

In accordance with a fourth aspect of the present invention, there is provided a method of making the density correction curves for the light color and the dark color which are used in a double-tone printer, the method comprising the steps of printing an image of a gray scale on a printing paper in light color ink according to a gray scale image signal which represents a gray scale having a plurality of regions which are different from each other in density and is made up of a series of image signal components and measuring the reflectance of the image on the printing paper, thereby obtaining a light color ink reflectance curve which represents the relation between the reflectance of each regions of the image of the gray scale printed on the printing paper in the light color ink and the value of the image signal components corresponding to the region, printing a solid image on a printing paper in the light color ink according to a solid image signal which represents a solid image made up of picture elements which are the same in density and is made up of a series of image signal components which are the same in value, printing on the printing paper in the dark color ink an image of a gray scale according to the gray scale image signal so that the image printed in the dark color ink overlap the image printed in the light color ink, and measuring the reflectance of the image on the printing paper, thereby obtaining a lapping dark color ink reflectance curve which represents the reflectance of each regions of the image of the gray scale printed on the printing paper in the dark color ink overlapping the light color ink and the value of the image signal components corresponding to the region, obtaining a target print reflectance curve, which represents a desired relation between the values of the image signal components and the reflectance of a printed image obtained by the double-tone printing, on the basis of said reflectance curves, obtaining a density correction curve for the light color, which, in order to express only in the light color ink a range of reflectance which can be expressed only in the light color ink, gives a print density which increases with increase in the value of the image signal component in a lower range where the values of the image signal components are lower than a threshold value and is fixed at a maximum value in a higher range where the values of the image signal components are not lower than the threshold value, on the basis of the target print reflectance curve and the light color ink reflectance curve, and obtaining a density correction curve for the dark color, which, in order to express in both the light color ink and the dark color ink a range of reflectance which cannot be expressed only in the light color ink, gives a print density which is fixed at a minimum value in the lower range and increases with increase in the value of the image signal component in the higher range, on the basis of the target print reflectance curve and the lapping dark color ink reflectance curve.

That is, in the method of the second aspect, the density correction curve for the dark color is made by use of the density correction curve for the light color which has been made before. To the contrast, in the method of the fourth aspect, the density correction curve for the dark color is made on the basis of the measured reflectance of the image of a gray scale in the dark color ink over a solid printing in the light color ink.

In accordance with a fifth aspect of the present invention, there is provided a double-tone printer having therein a system for making the density correction curves for the light color and the dark color according to the method of the fourth aspect. That is, the double-tone printer in accordance with the fifth aspect of the present invention comprises an image input means which inputs a digital image signal made up of a series of image signal components each representing a picture element on an original, a tone curve storage means which stores a tone curve representing the relation between the value of each image signal component of the digital image signal and the print density to be used in double-tone printing, a density correction means which corrects the densities of the picture elements represented by the image signal components of the digital image signal according to a predetermined density correction curve, and a stencil master making/printing means which binary-codes the densities of the picture elements represented by the corrected image signal, makes a stencil master on the basis of the binary-coded image signal and makes a print by use of the stencil master, wherein the improvement comprises a gray scale printing means which prints an image of a gray scale in light color ink on a first printing paper according to a gray scale image signal which represents a gray scale having a plurality of regions which are different from each other in density and is made up of a series of image signal components, a lap printing means which prints a solid image on a second printing paper in the light color ink according to a solid image signal which represents a solid image made up of picture elements which are the same in density and is made up of a series of image signal components which are the same in value, and prints on the second printing paper in the dark color ink an image of a gray scale according to the gray scale image signal so that the image printed in the dark color ink overlap the image printed in the light color ink, a colorimetry means which measures the reflectances of the images on the first and second printing papers, a light color ink reflectance curve making means which makes a light color ink reflectance curve, which represents the relation between the reflectance of each regions of the image of the gray scale printed on the first printing paper in the light color ink and the value of the image signal components corresponding to the region, on the basis of the measured reflectance of the image on the first printing paper, a lapping dark color ink reflectance curve making means which makes a lapping dark color ink reflectance curve, which represents the reflectance of each regions of the image of the gray scale printed on the printing paper in the dark color ink overlapping the light color ink and the value of the image signal components corresponding to the region, on the basis of the measured reflectance of the image on the second printing paper, a target print reflectance curve making means which makes a target print reflectance curve, which represents a desired relation between the values of the image signal components and the reflectance of a printed image obtained by the double-tone printing, on the basis of said reflectance curves, a light color density correction curve making means which makes a density correction curve for the light color, for expressing only in the light color ink a range of reflectance which can be expressed only in the light color ink, on the basis of the target print reflectance curve and the light color ink reflectance curve, and a dark color density correction curve making means which makes a density correction curve for the dark color, for expressing in both the light color ink and the dark color ink a range of reflectance which cannot be expressed only in the light color ink, on the basis of the target print reflectance curve and the lapping dark color ink reflectance curve, wherein the density correction means corrects the densities of the picture elements represented by the image signal components of the digital image signal according to one of the density correction curves for the light color and the dark color so that the range of density which can be expressed only in the light color ink is expressed only in the light color ink and the range of density which cannot be expressed only in the light color ink is expressed in both the light color ink and the dark color ink.

In the double-tone printers of the present invention, since the low density region is printed only in the light color ink, the density of the picture elements can be higher as compared with in the conventional double-tone printer where the low density is printed both the light color ink and the dark color ink, whereby appearance of grain coarseness in a low density region can be suppressed. Further since the density range which cannot be expressed only in the light color ink is constantly printed in both the light color ink and the dark color ink and there is no density range which is printed only in the dark color ink, appearance of rough impression in an intermediate density region can be suppressed. Further even if the image printed in the light color is somewhat shifted from the image printed in the dark color, quality of the printed image is not largely affected, whereby load on the operator is reduced and a high quality printing can be effected quickly and surely.

Further in accordance with the method of making density correction curves of the present invention, since test printing of a digital gray scale and the like is measured by a colorimetry and the like, the measured reflectance is related to the image signal component for a picture element and the density correction curve is made on the basis of the measured relation between the image signal component and the reflectance so that a desired tone curve is obtained, the density correction curves for double-tone printing can be made rationally in a routinized manner even by an unskilled operator.

DESCRIPTION OF THE PREFERRED EMBODIMENT

Figure 1:
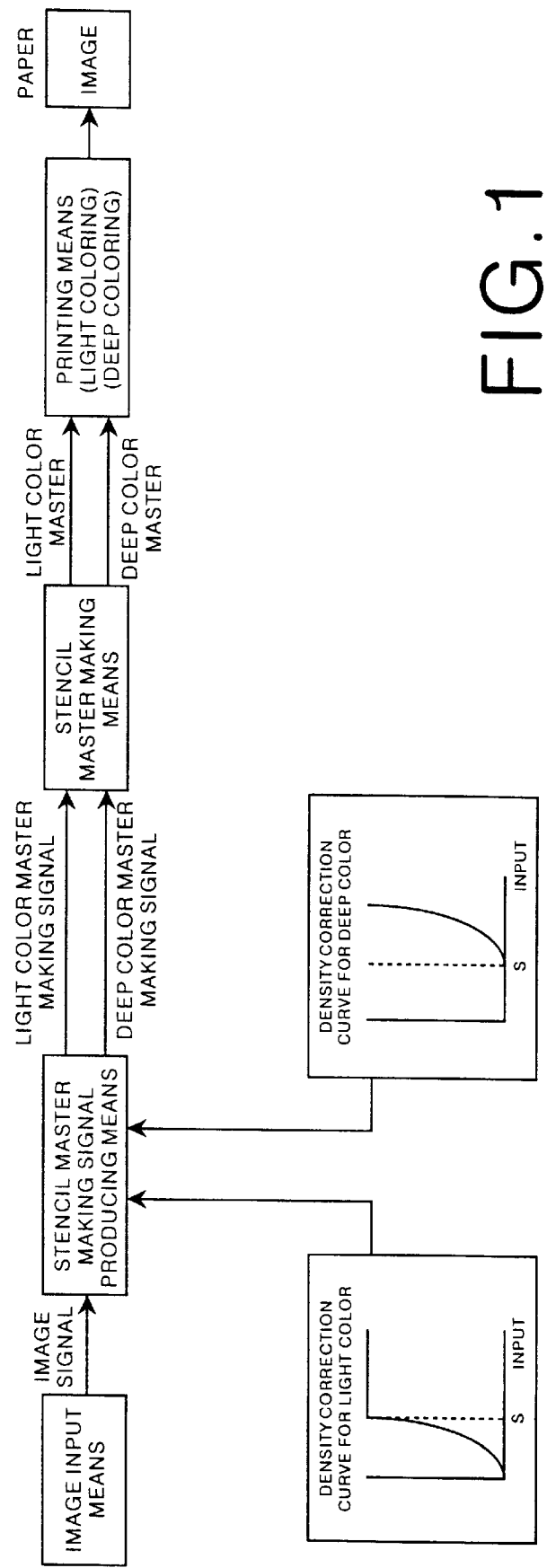
FIG. 1 is a schematic view showing the basic structure of the double-tone printer of the present invention.
Figure 2:
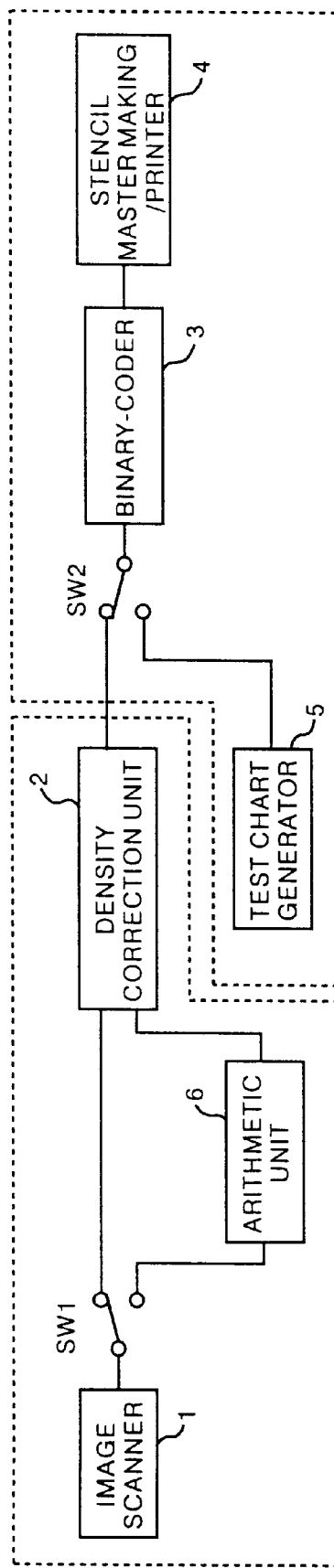
FIG. 2 is a schematic view showing a double-tone printer in accordance with a first embodiment of the present invention.

In FIG. 2, a double-tone printer in accordance with a first embodiment of the present invention comprises an image scanner 1, a density correction unit 2 and an arithmetic unit 6 which are selectively connected to the image scanner 1 by a switch SW1, a test chart generator 5, a binary-coder 3 which selectively receives output signals from the density correction unit 2 and the test chart generator 5 by way of a switch SW2 and binary-codes the output signal received, and a stencil master making/printer 4 which makes a stencil master on the basis of binary-coded signal and prints the image of the stencil master. The stencil master making/printer 4 is provided with a removable ink drum unit and the printing color can be easily changed by changing the ink drum units, e.g., a gray ink (light color ink) drum unit and a black ink (dark color) drum unit. (see, for instance, Japanese Unexamined Patent Publication No. 7(1995)-132671.)

Figure 3:
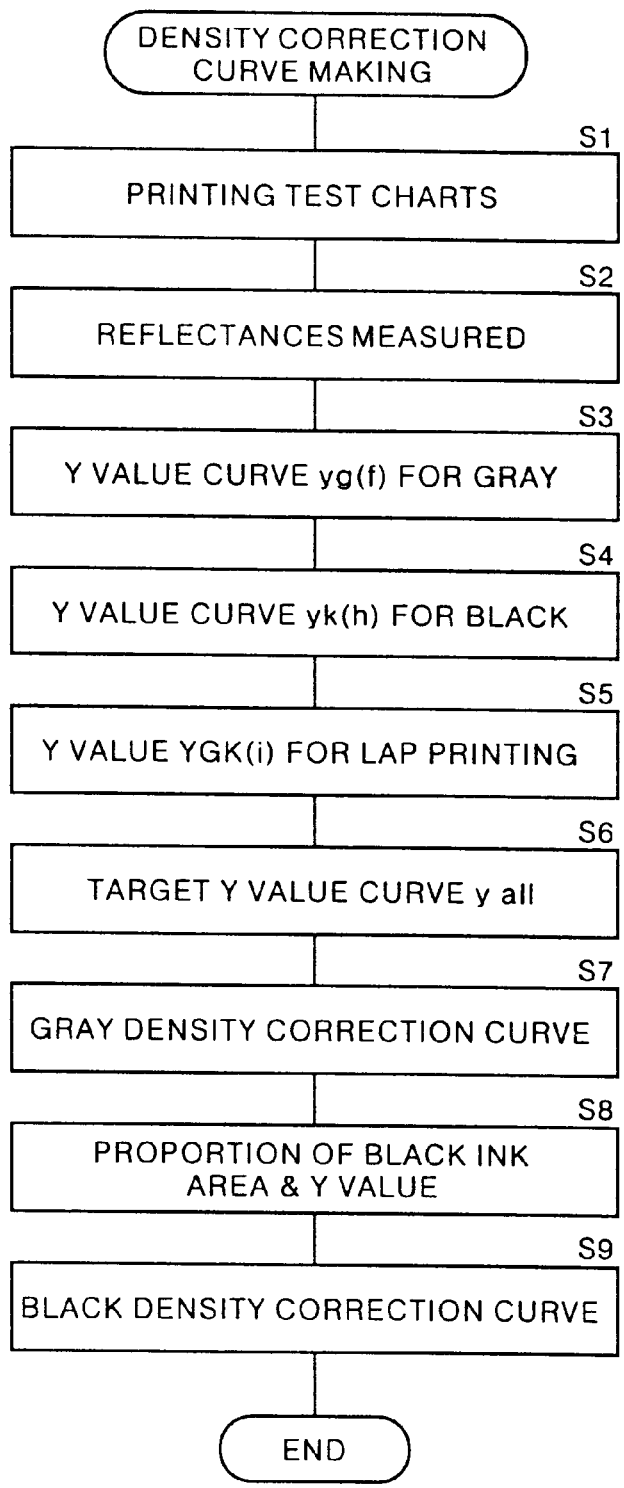
FIG. 3 is a flow chart for illustrating in brief the processing of making the density correction curves.

FIG. 3 shows a flow chart for illustrating in brief the processing of making the density correction curves in the double-tone printer of this embodiment. As shown in FIG. 3, in the double-tone printer, test charts are first printed, and the printed test chart is measured for the Y value which is one of the tristimulus values in a XYZ color specification system, whereby a curve representing the relation between the values of image signal components of an image signal and the Y values. This curve will be referred to as "the Y value curve", hereinbelow. A target print Y value curve is obtained by relating the Y value curve with a preset tone curve, and a gray density correction curve and a black density correction curve are obtained by reverse operations so that the measured Y values conform to target Y values. The Y value generally corresponds to brightness or luminous reflectance and substantially correlates with color value of an object.

The processing of making the density correction curves will be described in conjunction with function of each element, hereinbelow.

Printing of the test charts will be described first. The test generator 5 selectively generates a test chart image of a gray scale and a test chart image of a solid image according to a mode selected. By effecting printing in the following manner, three kinds of test printings are obtained.

When a gray scale printing mode is selected, the test chart generator 5 is connected to the binary-coder 3 through the switch SW2, and a digital image signal representing a gray scale (an image where the values of image signal components vary sequentially) generated by the test chart generator 5 is input into the binary-coder 3. The binary-coded image signal is input into the stencil master making/printer 4 and the stencil master/making printer 4 makes a stencil master on the basis of the binary-coded image signal and prints the image of the stencil master. At this time, by changing the ink drum units, the gray scale image is printed in both the gray ink and the black ink, thereby obtaining two printings.

Then when a solid image printing mode is selected, the test chart generator 5 is connected to the binary-coder 3 through the switch SW2, and a digital image signal representing a solid image (an image consisting of picture elements all of which are represented by image signal components of maximum values) generated by the test chart generator 5 is input into the binary-coder 3. The binary-coded image signal is input into the stencil master making/printer 4 and the stencil master/making printer 4 makes a perforated stencil master on the basis of the binary-coded image signal and prints the image of the stencil master. At this time, the image of the stencil master is first printed in the gray ink and then in the black ink so that the image in the black ink overlaps the image in the gray ink. (step S1)

Now the processing of making the density correction curves on the basis of the three printings thus obtained will be described, hereinbelow. When an operation mode is selected with each of the printings set to the image scanner 1, the image scanner 1 is connected to the arithmetic unit 6 through the switch SW1. The image scanner 1 reads out the images on the respective printings and the digital image signals representing the three images are stored in the arithmetic unit 6. (step S2) Then the gray density correction curve γ_g and the black density correction curve γ_k are calculated in a manner to be described later. The density correction curves calculated are stored in the density correction unit 2 and are used for density correction when an original read by the image scanner 1 is printed.

In this particular embodiment, the image scanner 1 doubles an image input means for inputting the image of an original and a colorimeter means for measuring the colors of the test charts.

The structure of the arithmetic unit 6 will be described with reference to FIG. 4 in conjunction with the method of calculating the gray density correction curve γ_g and the black density correction curve γ_k, hereinbelow.

When the operation mode is selected, the image signal b representing the gray scale print image in the gray ink is stored in a gray image memory 8, the image signal c representing the gray scale print image in the black ink is stored in a black image memory 9, and the image signal d representing the lap solid image is stored in a lap image memory 10. These image signals are input into a Y value convertor 12 from the respective memories.

Figure 5:
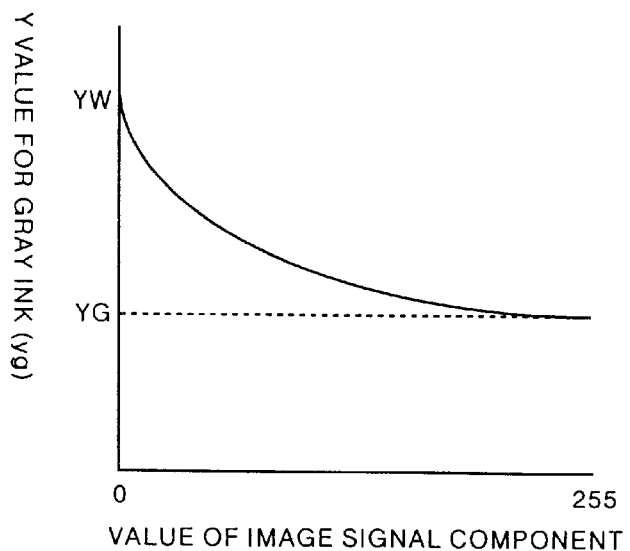
FIG. 5 is a view showing the Y value curve for the gray ink.
Figure 6:
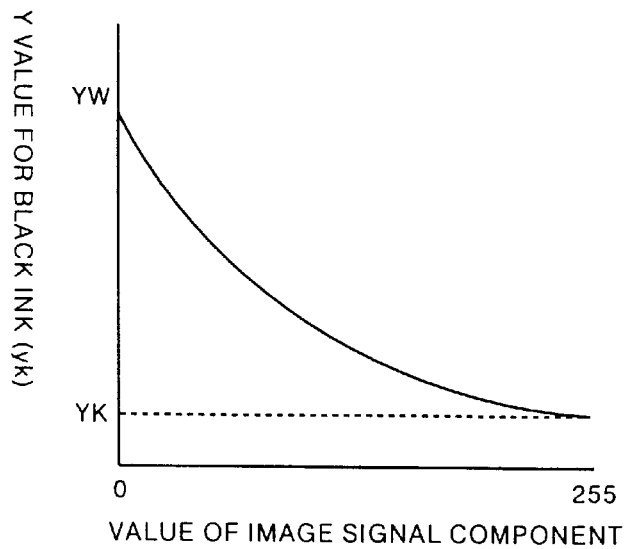
FIG. 6 is a view showing the Y value curve for the black ink.

In the Y value convertor 12, since the value of image signal components of the image signal read out by the image scanner are in proportion to Y values, the image signal components of the image signal b representing the gray scale print image in the gray ink are converted to Y values on the basis of a proportionality factor which has been measured and a Y value curve yg(f) for the gray ink shown in FIG. 5 is output. (step S3) The image signal components of the image signal c representing the gray scale print image in the black ink are converted to Y values and a Y value curve yk(h) for the black ink shown in FIG. 6 is output. (step S4) The image signal components of the image signal d representing the lap solid image are converted to Y values and the Y value YGK(i) for the lap printing is output. (step S5)

Figure 7:
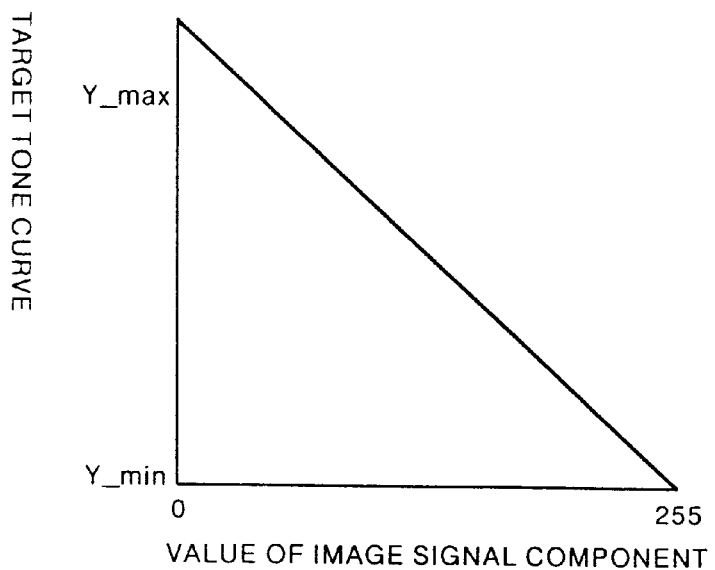
FIG. 7 is a view showing the target tone curve.

A desired tone curve, which represents the contrast of a target print Y value for a given value of a image signal component of the digital image signal, is preset and stored in a tone curve memory 7. In this embodiment, the target tone curve is as shown in FIG. 7, where Y_max represents a maximum print Y value and Y_min represents a minimum print Y value.

Figure 4:
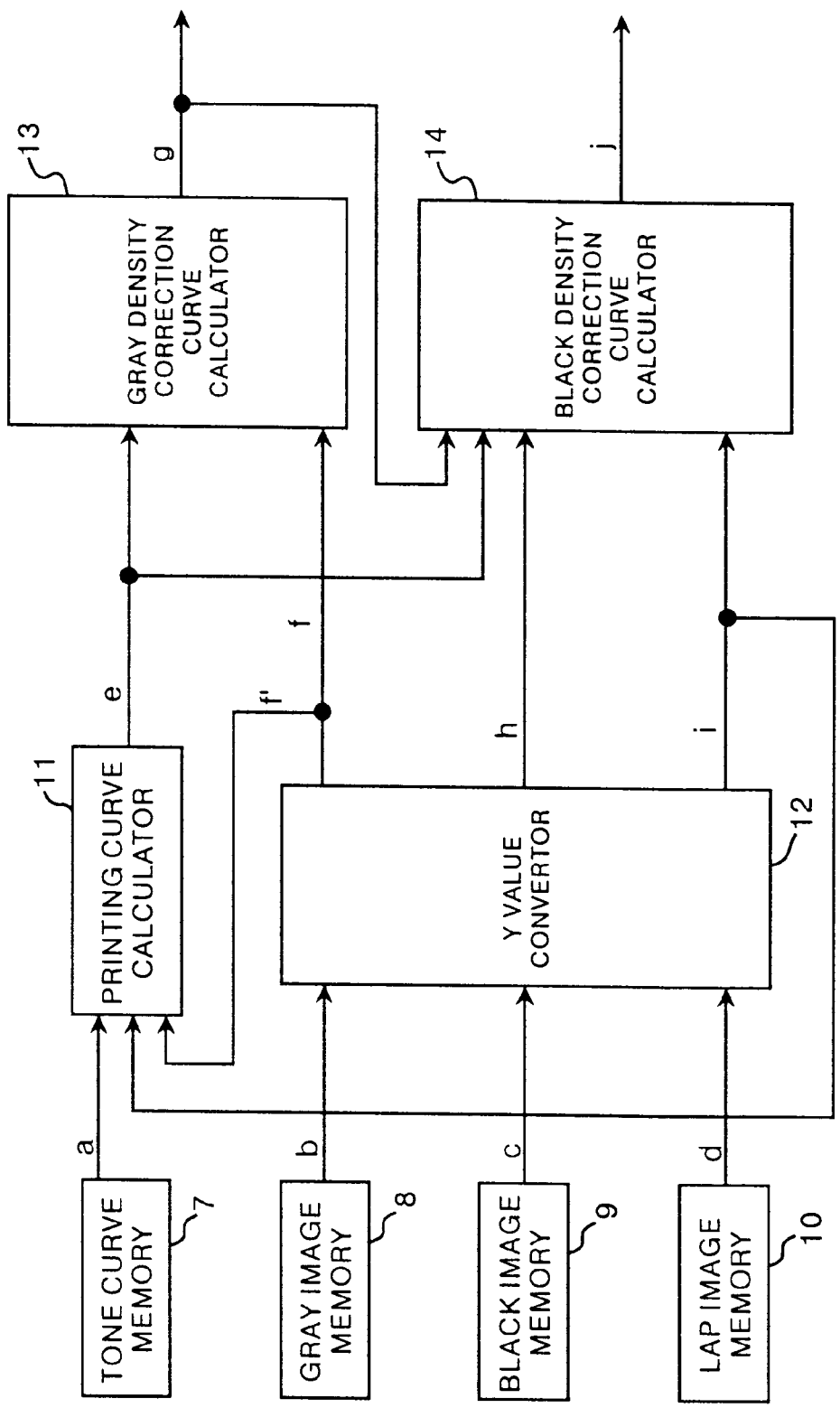
FIG. 4 is a block diagram showing in detail the arithmetic unit employed in the double-tone printer shown in FIG. 2.

In FIG. 4, the target tone curve a stored in the tone curve memory 7, the Y value YGK(i) for the lap printing and the maximum value (the Y value of the printing paper) YW(f) of the Y value curve yg(f) for the gray ink are input into a printing curve calculator 11. YW is substituted for the maximum print Y value Y_max and YGK is substituted for the minimum print Y value Y_min, whereby a target print Y value curve $y_{all}(e)$ is calculated and output. (step S6) The target print Y value curve $y_{all}(e)$ output from the printing curve calculator 11 and the Y value curve yg(f) for the gray ink output from the Y value convertor 12 are input into a gray density correction curve calculator 13.

Figure 9:
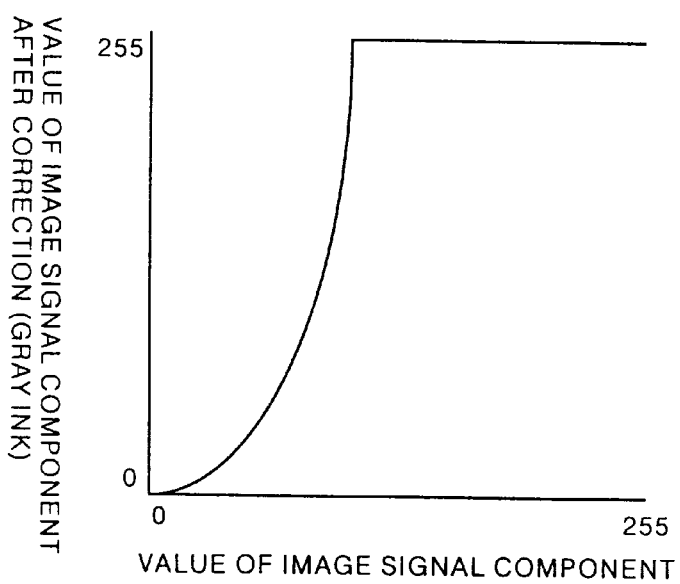
FIG. 9 is a view showing the gray density correction curve.

The gray density correction curve calculator 13 calculates a gray density correction curve γ_g such as shown in FIG. 9 by determining the print Y value for a given value of the image signal component according to the target print Y value curve $y_{all}(e)$ and referring to the Y value curve yg(f) for the gray ink. (step S7) However, in a range where the target print Y value is smaller than the minimum value YG of the Y value curve yg(f) for the gray ink, the value of the image signal component after correction is fixed to 255. That is, since such a range cannot be expressed solely in the gray ink, the range is printed solidly in the gray ink.

The gray density correction curve γ_g thus calculated is stored in the density correction unit 2 and is used for density correction.

Calculation of the black density correction curve γ_k for expressing the region which cannot be expressed solely by the gray ink will be described hereinbelow.

The Y value $y_{all}$ obtained by lap printing of the gray ink and the black ink is generally represented by the following formula (2) by use of Neugebauer equation.

$$AW=(1-ag)(1-ak)$$
$$AG=ag(1-ak)$$
$$AK=(1-ag)ak$$
$$AGK=ag \cdot ak$$
$$y_{all}=YW \cdot AW+YG \cdot AG+YK \cdot AK+YGK \cdot AGK \quad (2)$$

wherein AW represents the proportion of the area of the region where neither of the gray ink and the black ink exists, AG represents the proportion of the area of the region where only the gray ink exists, AK represents the proportion of the area of the region where only the black ink exists, AGK represents the proportion of the area of the region where the gray ink and the black ink overlap each other, ag represents the proportion of the area of the region where the gray ink exists including the region where the gray ink and the black ink overlap each other, ak represents the proportion of the area of the region where the black ink exists including the region where the gray ink and the black ink overlap each other, YW represents the Y value of the printing paper, YK represents the Y value obtained by solid printing in the black ink, YG represents the Y value obtained by solid printing in the gray ink, and YGK represents the Y value obtained by solid printing in the gray ink and solid printing in the black ink which overlap each other.

Formula (1) is an equation with unknowns ag and ak, and accordingly, when the values of ag and ak are given, the print Y value $y_{all}$ when printing is effected in the gray ink and the black ink in proportions of area of ag and ak can be obtained.

In this invention, on the basis of this principle, the Y values which cannot be expressed solely in the gray ink are realized by printing in the black ink over a solid printing in the gray ink.

The print Y value $y_{all}(e)$ output from the print curve calculator 11, the gray density correction curve γ_g output from the gray density correction curve calculator 13 and the Y value curve yk(h) for the black ink and the Y value YGK(i) for the lap printing output from the Y value convertor 12 are input into a black density correction curve calculator 14. Then the proportion of area ak of the black ink for expressing the range of the Y value which cannot be expressed solely in the gray ink by overlaying printing in the black ink on the solid printing in the gray ink is obtained. By substituting ag=1 and the print Y value curve $y_{all}$ for the range which cannot be expressed solely in the gray ink are substituted in formula (1), ak is calculated.

Figure 10:
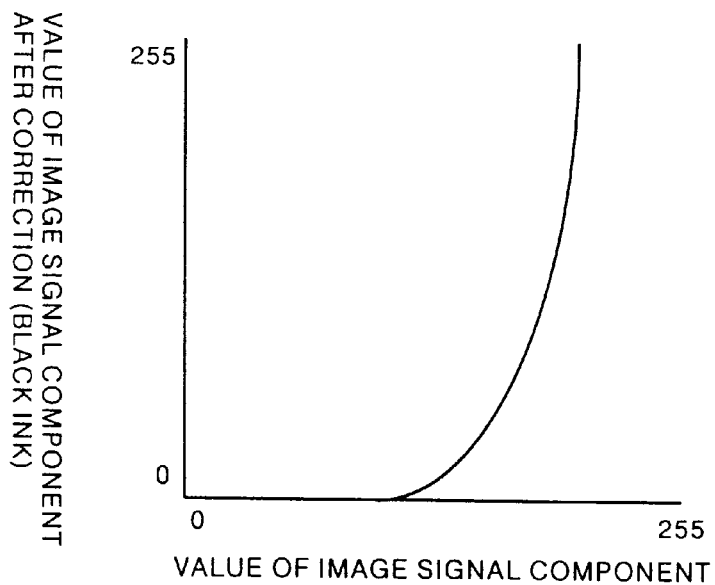
FIG. 10 is a view showing the black density correction curve.

Calculated value of ak is substituted in the following formula (3)

$$Yk \cdot W(1-ak)+Yk||k \quad (3)$$

and the Y value Yk for the black ink corresponding to the value of ak is calculated. (step S8) Formula (3) is a form of Neugebauer equation applied to monochrome printing. Then the value of the image signal component which gives a Y value equal to the Y value Yk for the black ink calculated is found referring to the Y value curve yk for the black ink, whereby the black density correction curve γ_k shown in FIG. 10 is calculated. (step S9) The calculated black density correction curve γ_k(j) is output and stored in the density correction unit 2 and is used for density correction.

In the embodiment described above, the density correction curves are made by use of three printings, the image of the gray scale printed in the gray ink, the image of the gray scale printed in the black ink and the overlapping solid prints in the gray ink and the black ink, as the test charts. However, the density correction curves may be made by use of an image of the gray scale printed in the gray ink and an image of the gray scale printed in the black ink overlaid on a solid printing in the gray ink as the test charts as in a second embodiment of the present invention described hereinbelow.

In the second embodiment, the double-tone printer may be the same as that shown in FIG. 2. In the second embodiment, when a gray scale printing mode is selected, the test chart generator 5 is connected to the binary-coder 3 through the switch SW2, and a digital image signal representing a gray scale generated by the test chart generator 5 is input into the binary-coder 3. The binary-coded image signal is input into the stencil master making/printer 4 and the stencil master/making printer 4 makes a stencil master on the basis of the binary-coded image signal and prints the image of the stencil master solely in the gray ink, whereby an image of the gray scale in the gray ink is obtained.

Then when a solid image printing mode is selected, the test chart generator 5 is connected to the binary-coder 3 through the switch SW2, and a digital image signal representing a solid image (an image consisting of picture elements all of which are represented by image signal components of maximum values) generated by the test chart generator 5 is input into the binary-coder 3. The binary-coded image signal is input into the stencil master making/printer 4 and the stencil master/making printer 4 makes a stencil master on the basis of the binary-coded image signal and prints the image of the stencil master solely in the gray ink, whereby a solid printing in the gray ink is obtained. Further, the image of the gray scale is printed in the black ink on the solid printing in the gray ink. This printing will be referred to as "the lap printing", hereinbelow.

Then the density correction curves are made on the basis of the two printings thus obtained. When an operation mode is selected with each of the printings set to the image scanner 1, the image scanner 1 is connected to the arithmetic unit 6 through the switch SW1. The image scanner 1 reads out the images on the respective printings and the digital image signals representing the two images are stored in the arithmetic unit 6.

Figure 11:
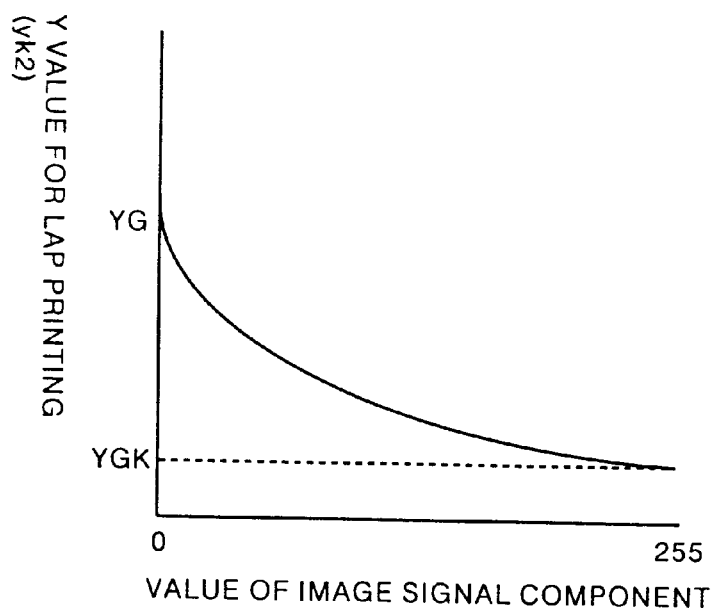
FIG. 11 is a view showing the Y value curve for the black ink overlaid on solid printing in the gray ink.

In the arithmetic unit 6, the image signal components of the image signal representing the gray scale print image in the gray ink are converted to Y values on the basis of a proportionality factor which has been measured and a Y value curve yg for the gray ink shown in FIG. 5 is obtained. The image signal components of the image signal representing the image on the lap printing are converted to Y values and a Y value curve yk2 for lap printing shown in FIG. 11 is obtained.

As in the first embodiment, a desired tone curve, which represents the contrast of a target print Y value for a given value of an image signal component of the digital image signal, is preset. In this embodiment, the target tone curve which gives a linear target print Y value curve $y_{all}$ as shown in FIG. 7 is set, where Y_max represents a maximum print Y value and Y_min represents a minimum print Y value.

Figure 8:
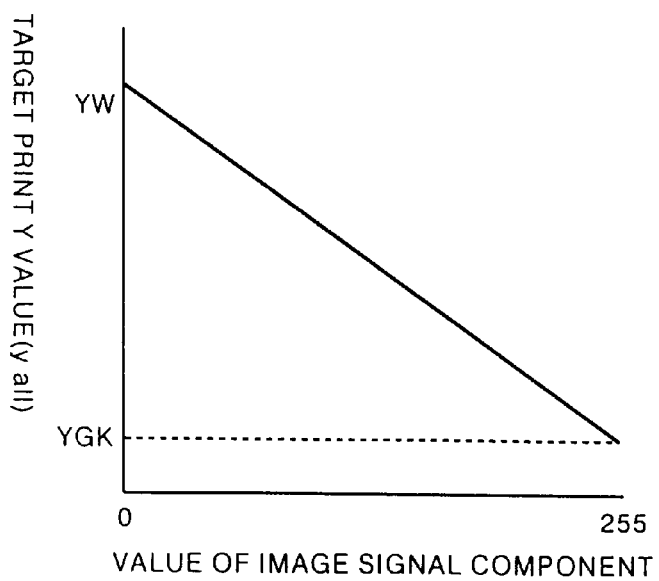
FIG. 8 is a view showing the target Y value curve.

The maximum value (the Y value of the printing paper) YW of the Y value curve for the gray ink is substituted for the maximum print Y value Y_max and the minimum value YGK of Y value curve for the lap printing is substituted for the minimum print Y value Y_min, whereby a target print Y value curve $y_{all}$ such as shown in FIG. 8 is obtained.

A gray density correction curve γ_g such as shown in FIG. 9 is calculated by determining the print Y value for a given value of the image signal component according to the target print Y value curve $y_{all}$ and referring to the Y value curve yg for the gray ink.

The black density correction curve can be obtained by obtaining a value of an image signal component which gives a Y value equal to each Y value on the target print Y value curve on the basis of the Y value curve yk2 for the lap printing for the range of the target print Y value curve $y_{all}$ which cannot be expressed solely in the gray ink, and relating the values of the image signal components thus obtained. For example, a black density correction curve such as shown in FIG. 10 is obtained from the target print Y value curve shown in FIG. 8 and the Y value curve yk2 for the lap printing shown in FIG. 11.

By use of the method described above, optimal density correction curves can be automatically made according to change in the printing conditions such as change in the pressure of the press roller, an extreme change in the environmental temperature, change of the printing paper, change of the inks and the like, whereby printings of high quality can be obtained.

Figure 12:
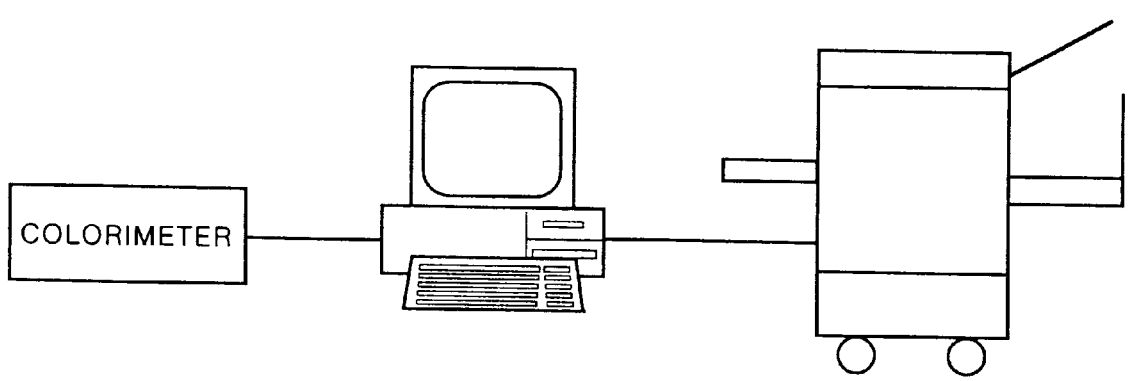
FIG. 12 is a schematic view showing a system where the digital stencil printer is not provided with density correction curve making function.

The double-tone printer need not be provided therein the arithmetic unit. For example, when a conventional digital stencil printer without arithmetic unit is employed, a computer is connected to the digital stencil printer and a calorimeter is connected to the computer and the density correction curves are made by the computer as shown in FIG. 12.

Figure 13:
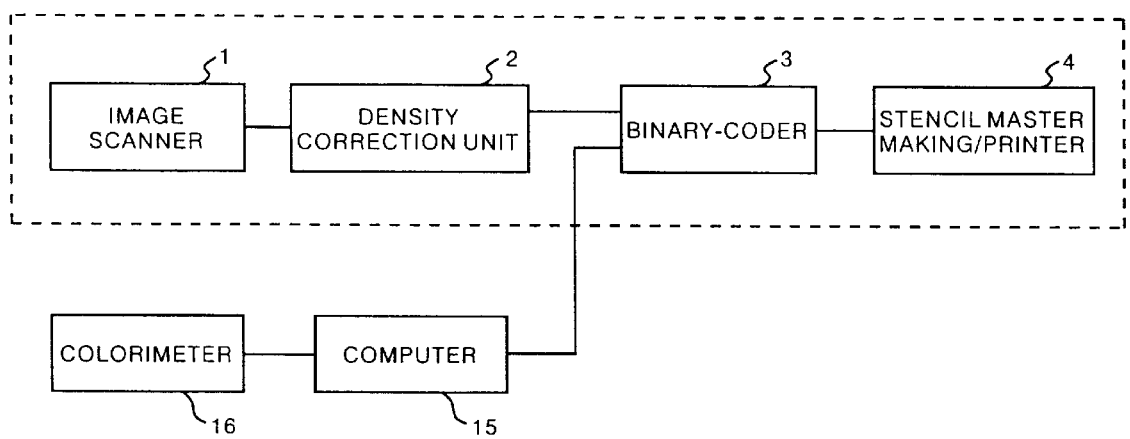
FIG. 13 is a view showing in detail the arrangement of the system.

As can be seen from FIG. 13, the computer 15 plays the test chart generator 5 and arithmetic unit 6 in FIG. 2, and the calorimeter 16 plays the image scanner 1 and the Y value convertor 12. The density correction curves made by the computer 15 is stored in a recording medium such as a ROM and the recording medium is loaded on the density correction unit 2 of the digital stencil printer for use in the density correction.

In the embodiments described above, since the density correction curves can be made by simply causing the system to read the printed test charts, even an unskilled operator can effect double-tone printing at an optimal density, whereby a print density suitable for suppressing appearance of grain coarseness in a low density region and appearance of rough impression in an intermediate density region can be quickly determined without repetition of trial printings and a high quality printing can be easily effected. Though the present invention is especially useful for double-tone printing by a digital stencil printer, the present invention can also be applied to double-tone printing by printers other than the stencil printer.

Further, a light color density correction curve and a dark color density correction curve suitable for double-tone printing by use of light color ink, dark color ink and printing papers which are designated in advance under a standard printing environment may be stored in a double-tone printer.

Further, though, in the embodiments described above, gray ink is employed as the light color ink and black ink is employed as the dark color ink, other two inks may be employed without limiting to gray and black inks so long as their colors are similar in hue and different in luminance.

What is claimed is:

1. A double-tone printer comprising
    an image input means which inputs an image signal made up of a series of image signal components each representing a picture element on an original,
    a stencil master making signal producing means which converts the image signal into a density signal made up of a series of density signal components each representing a print density of a picture element according to a density correction curve for a light color and makes a stencil master making signal for the light color by binary-coding the density signal components and which converts the image signal into a density signal made up of a series of density signal components each representing a print density of a picture element according to a density correction curve for a dark color and makes a stencil master making signal for the dark color by binary-coding the density signal components,
    a stencil master making means which makes a light color stencil master and a dark color stencil master respectively on the basis of the stencil master making signal for the light color and the stencil master making signal for the dark color, and
    a printing means which prints the images of the respective stencil masters on a printing paper in light color ink and dark color ink so that the printed images in the respective color inks overlap each other,
    wherein the improvement comprises that
        the density correction curve for the light color gives a print density which increases with increase in the value of the image signal component in a lower range where the values of the image signal components are lower than a threshold value and is fixed at a maximum value in a higher range where the values of the image signal components are not lower than the threshold value, and
        the density correction curve for the dark color gives a print density which is fixed at a minimum value in the lower range and increases with increase in the value of the image signal component in the higher range.

2. A double-tone printer as defined in claim 1 in which the density correction curves are made on the basis of test charts printed by use of said stencil master making means and said printing means.

3. A method of making the density correction curves for the light color and the dark color which are used in a double-tone printer, the method comprising the steps of obtaining a gray scale image signal which represents a gray scale having a plurality of regions which are different from each other in density and is made up of a series of image signal components, obtaining a solid image signal which represents a solid image made up of picture elements which are the same in density and is made up of a series of image signal components which are the same in value, printing an image of a gray scale in light color ink on a first printing paper according to the gray scale image signal, an image of a gray scale in dark color ink on a second printing paper according to the gray scale image signal, and solid images on a third printing paper in the light color ink and the dark color ink according to the solid image signal so that the images printed in the light color ink and the dark color ink overlap each other, measuring the reflectances of the images on the first to third printing papers, thereby obtaining a light color ink reflectance curve which represents the relation between the reflectance of each region of the image of the gray scale printed on the first printing paper in the light color ink and the value of the image signal components corresponding to the region, a dark color ink reflectance curve which represents the relation between the reflectance of each regions of the image of the gray scale printed on the second printing paper in the dark color ink and the value of the image signal components corresponding to the region, and the reflectance given by the overlapping solid prints in the light color ink and the dark color ink, obtaining a target print reflectance curve, which represents a desired relation between the values of the image signal components and the reflectance of a printed image obtained by the double-tone printing on the basis of said reflectance curves and the reflectance given by the overlapping solid prints, obtaining a density correction curve for the light color, which, in order to express only in the light color ink a range of reflectance which can be expressed only in the light color ink, gives a print density which increases with increase in the value of the image signal component in a lower range where the values of the image signal components are lower than a threshold value and is fixed at a maximum value in a higher range where the values of the image signal components are not lower than the threshold value, on the basis o the target print reflectance curve and the light color ink reflectance curve, calculating the proportion of the area of the dark color ink and the reflectance of the dark color ink corresponding to the proportion of the area of the dark color ink on the basis of the density correction curve for the light color and the target print reflectance curve, and obtaining a density correction curve for the dark color, which, in order to express in both the light color ink and the dark color ink a range of reflectance which cannot be expressed only in the light color ink, gives a print density which is fixed at a minimum value in the lower range and increases with increase in the value of the image signal component in the higher range on the basis of the calculated reflectance of the dark color ink and the dark color ink reflectance curve.

4. A method of making the density correction curves for the light color and the dark color which are used in a double-tone printer, the method comprising the steps of printing an image of a gray scale on a printing paper in light color ink according to a gray scale image signal which represents a gray scale having a plurality of regions which are different from each other in density and is made up of a series of image signal components and measuring the reflectance of the image on the printing paper, thereby obtaining a light color ink reflectance curve which represents the relation between the reflectance of each region of the image of the gray scale printed on the printing paper in the light color ink and the value of the image signal components corresponding to the region, printing a solid image on a printing paper in the light color ink according to a solid image signal which represents a solid image made up of picture elements which are the same in density and is made up of a series of image signal components which are the same in value, printing on the printing paper in the dark color ink an image of a gray scale according to the gray scale image signal so that the image printed in the dark color ink overlap the image printed in the light color ink, and measuring the reflectance of the image on the printing paper, thereby obtaining a lapping dark color ink reflectance curve which represents the reflectance of each region of the image of the gray scale printed on the printing paper in the dark color ink overlapping the light color ink and the value of the image signal components corresponding to the region, obtaining a target print reflectance curve, which, represents a desired relation between the values of the image signal components and the reflectance of a printed image obtained by the double-tone printing, on the basis of said reflectance curves, obtaining a density correction curve for the light color, which, in order to express only in the light color ink a range of reflectance which can be expressed only in the light color ink, gives a print density which increases with increase in the value of the image signal component in a lower range where the values of the image signal components are lower than a threshold value and is fixed at a maximum value in a higher range where the values of the image signal components are not lower than the threshold value, on the basis of the target print reflectance curve and the light color ink reflectance curve, and obtaining a density correction curve for the dark color, which in order to express in both the light color ink and the dark color ink a range of reflectance which cannot be expressed only in the light color ink, gives a print density which is fixed at a minimum value in the lower range and increases with increase in the value of the image signal component in the higher range, on the basis of the target print reflectance curve and the lapping dark color ink reflectance curve.

5. A double-tone printer comprising an image input means which inputs a digital image signal made up of a series of image signal components each representing a picture element on an original, a tone curve storage means which stores a tone curve representing the relation between the value of each image signal component of the digital image signal and the print density to be used in double-tone printing, a density correction means which corrects the densities of the picture elements represented by the image signal components of the digital image signal according to a predetermined density correction curve, and a stencil master making/printing means which binary-codes the densities of the picture elements represented by the corrected image signal, makes a stencil master on the basis of the binary-coded image signal and makes a print by use of the stencil master, wherein the improvement comprises a gray scale printing means which prints an image of a gray scale in light color ink on a first printing paper according to a gray scale image signal which represents a gray scale having a plurality of regions which are different from each other in density and is made up of a series of image signal components, and prints an image of a gray scale in dark color ink on a second printing paper according to the gray scale image signal, a solid image printing means which prints solid images on a third printing paper in the light color ink and the dark color ink according to a solid image signal which represents a solid image made up of picture elements which are the same in density and is made up of a series of image signal components which are the same in value so that the images printed in the light color ink and the dark color ink overlap each other, a colorimetry means which measures the reflectances of the images on the first to third printing papers, a light color ink reflectance curve making means which makes a light color ink reflectance curve, which represents the relation between the reflectance of each region of the image of the gray scale printed on the first printing paper in the light color ink and the value of the image signal components corresponding to the region, on the basis of the measured reflectance of the image on the first printing paper, a dark color ink reflectance curve making means which makes a dark color ink reflectance curve, which represents the relation between the reflectance of each region of the image of the gray scale printed on the second printing paper in the dark color ink and the value of the image signal components corresponding to the region, on the basis of the measured reflectance of the image on the second printing paper, a target print reflectance curve making means which makes a target print reflectance curve, which represents a desired relation between the values of the image signal components and the reflectance of a printed image obtained by the double-tone printing, on the basis of said reflectance curves and the reflectance of each region of the image, a light color density correction curve making means which makes a density correction curve for the light color, for expressing only in the light color ink a range of reflectance which can be expressed only in the light color ink, on the basis of the target print reflectance curve and the light color ink reflectance curve, a calculating means which calculates the proportion of the area of the dark color ink and the reflectance of the dark color ink corresponding to the proportion of the area of the dark color ink on the basis of the density correction curve for the light color and the target print reflectance curve, and a dark color density correction curve making means which makes a density correction curve for the dark color, for expressing in both the light color ink and the dark color ink a range of reflectance which cannot be expressed only in the light color ink, on the basis of the calculated reflectance of the dark color ink and the dark color ink reflectance curve, wherein the density correction means corrects the densities of the picture elements represented by the image signal components of the digital image signal according to one of the density correction curves for the light color and the dark color so that the range of density which can be expressed only in the light color ink is expressed only in the light color ink and the range of density which cannot be expressed only in the light color ink is expressed in both the light color ink and the dark color ink.

6. A double-tone printer comprising an image input means which inputs a digital image signal made up of a series of image signal components each representing a picture element on an original, a tone curve storage means which stores a tone curve representing the relation between the value of each image signal component of the digital image signal and the print density to be used in double-tone printing, a density correction means which corrects the densities of the picture elements represented by the image signal components of the digital image signal according to a predetermined density correction curve, and a stencil master making/printing means which binary-codes the densities of the picture elements represented by the corrected image signal, makes a stencil master on the basis of the binary-coded image signal and makes a print by use of the stencil master, wherein the improvement comprises a gray scale printing means which prints an image of a gray scale in light color ink on a first printing paper according to a gray scale image signal which represents a gray scale having a plurality of regions which are different from each other in density and is made up of a series of image signal components, a lap printing means which prints a solid image on a second printing paper in the light color ink according to a solid image signal which represents a solid image made up of picture elements which are the same in density and is made up of a series of image signal components which are the same in value, and prints on the second printing paper in the dark color ink an image of a gray scale according to the gray scale image signal so that the image printed in the dark color ink overlap the image printed in the light color ink, a colorimetry means which measures the reflectances of the images on the first and second printing papers, a light color ink reflectance curve making means which makes a light color ink reflectance curve, which represents the relation between the reflectance of each regions of the image of the gray scale printed on the first printing paper in the light color ink and the value of the image signal components corresponding to the region, on the basis of the measured reflectance of the image on the first printing paper, a lapping dark color ink reflectance curve making means which makes a lapping dark color ink reflectance curve, which represents the reflectance of each region of the image of the gray scale printed on the printing paper in the dark color ink overlapping the light color ink and the value of the image signal components corresponding to the region, on the basis of the measured reflectance of the image on the second printing paper, a target print reflectance curve making means which makes a target print reflectance curve, which represents a desired relation between the values of the image signal components and the reflectance of a printed image obtained by the double-tone printing, on the basis of said reflectance curves, a light color density correction curve making means which makes a density correction curve for the light color, for expressing only in the light color ink a range of reflectance which can be expressed only in the light color ink, on the basis of the target print reflectance curve and the light color ink reflectance curve, and a dark color density correction curve making means which makes a density correction curve for the dark color, for expressing in both the light color ink and the dark color ink a range of reflectance which cannot be expressed only in the light color ink, on the basis of the target print reflectance curve and the lapping dark color ink reflectance curve, wherein the density correction means corrects the densities of the picture elements represented by the image signal components of the digital image signal according to one of the density correction curves for the light color and the dark color so that the range of density which can be expressed only in the light color ink is expressed only in the light color ink and the range of density which cannot be expressed only in the light color ink is expressed in both the light color ink and the dark color ink.

\* \* \* \* \*